United States Patent
Duraffourg

(10) Patent No.: US 10,254,304 B2
(45) Date of Patent: Apr. 9, 2019

(54) OPTO-MECHANICAL PHYSICAL SENSOR WITH AN IMPROVED SENSITIVITY

(71) Applicant: Commissariat A L'Energie Atomique et aux Energies Alternatives, Paris (FR)

(72) Inventor: Laurent Duraffourg, Voiron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 119 days.

(21) Appl. No.: 15/274,153

(22) Filed: Sep. 23, 2016

(65) Prior Publication Data
US 2017/0089944 A1    Mar. 30, 2017

(30) Foreign Application Priority Data
Sep. 24, 2015 (FR) ..................... 15 59015

(51) Int. Cl.
| | |
|---|---|
| *G01P 15/093* | (2006.01) |
| *G01D 5/353* | (2006.01) |
| *G01P 15/08* | (2006.01) |
| *G01H 9/00* | (2006.01) |

(Continued)

(52) U.S. Cl.
CPC ........ *G01P 15/093* (2013.01); *G01D 5/35306* (2013.01); *G01H 9/00* (2013.01); *G01H 13/00* (2013.01); *G01L 1/242* (2013.01); *G01P 15/0802* (2013.01)

(58) Field of Classification Search
CPC .................................................. G01P 15/093
See application file for complete search history.

(56) References Cited

U.S. PATENT DOCUMENTS

| | | |
|---|---|---|
| 4,567,771 A | 2/1986 | Nelson et al. |
| 6,807,325 B1 | 10/2004 | Kraemmer et al. |
| 2003/0206693 A1 | 11/2003 | Tapalian et al. |

(Continued)

FOREIGN PATENT DOCUMENTS

| | | |
|---|---|---|
| DE | 41 24 685 A1 | 11/1992 |
| WO | WO 00/72025 A1 | 11/2000 |

(Continued)

OTHER PUBLICATIONS

U.S. Appl. No. 13/702,790, filed Feb. 20, 2013, 2013/0144542 A1, Thomas Ernst et al.

(Continued)

*Primary Examiner* — Son T Le
*Assistant Examiner* — Herbert K Roberts
(74) *Attorney, Agent, or Firm* — Oblon, McClelland, Maier & Neustadt, L.L.P.

(57) ABSTRACT

A physical sensor comprising a substrate, a movable mass, said mass being able to be moved by an external force, a first optical resonator, a light wave guide for measurement and a light wave guide for detection, a rigid plate which are able to modify the optical resonance frequency of said optical resonator by moving closer and away the same, a lever arm rotatably hinged to the substrate by a pivot connection and the mass being movably integral with the transmitting means, the rigid plate being disposed relative to the mass and to the pivot connection such that the lever arm transmits to the rigid plate, in an amplified manner, the displacement of the mass.

15 Claims, 8 Drawing Sheets

(51) Int. Cl.
    *G01H 13/00*    (2006.01)
    *G01L 1/24*     (2006.01)

(56) References Cited

U.S. PATENT DOCUMENTS

2008/0271533 A1    11/2008  Csutak
2009/0133505 A1     5/2009  Sheverev et al.
2014/0283601 A1*    9/2014  Bhave .................. G01P 15/093
                                                         73/504.12

FOREIGN PATENT DOCUMENTS

WO    WO 2012/142654 A1    10/2012
WO    WO 2013/052953 A1     4/2013
WO    WO 2015080662 A1 *    6/2015    ............ G01P 15/093

OTHER PUBLICATIONS

U.S. Appl. No. 14/003,560, filed Feb. 10, 2014, 2014/0148575 A1, Vincent Forge et al.
U.S. Appl. No. 14/030,205, filed Sep. 18, 2013, 2014/0076024 A1, Laurent Duraffourg et al.
U.S. Appl. No. 14/029,920, filed Sep. 18, 2013, 2014/0079091 A1, Jeremie Ruellan et al.
U.S. Appl. No. 14/519,390, filed Oct. 21, 2014, 2015/0107357 A1, Sebastien Hentz et al.
U.S. Appl. No. 14/429,676, filed Mar. 19, 2015, 2015/0247828 A1, Jeremie Ruellan et al.
U.S. Appl. No. 14/619,656, filed Feb. 11, 2015, 2015/0226713 A1, Jeremie Ruellan et al.
U.S. Appl. No. 15/031,198, filed Apr. 21, 2016, 2016/0246000 A1, Laurent Duraffourg et al.
U.S. Appl. No. 15/245,472, filed Aug. 24, 2016, Laurent Duraffourg.
G. Anetsberger et al "Near-field cavity optomechanics with nanomechanical oscillators", Nature Physics, Oct. 2009, 6 pages.
L. Ding et al. "Wavelength-sized GaAs optomechanical resonators with gigahertz frequency", Applied Physics Letters 98, 2011, 4 pages.
B. Dong et al. "An On-Chip Opto-Mechanical Accelerometer", MEMS 2013, 4 pages.
Matt Eichenfield et al "Actuation of micro-optomachanical systems via cavity-enhanced optical dipole forces", Nature Photonics, vol. 1, 2007, 7 pages.
I.Favero et al. Optical cooling of a micromirror of wavelength size:, Applied Physics Letters 90, 2007, 4 pages.
Alexander G. Krause et al. "A high-resolution microchip optomechanical accelerometer", Nature Photonics, vol. 6, 2012, 5 pages.
Mo Li et al. "Harnessing optical forces in integrated photonic circuits", Nature Letters, vol. 456, 2008, 6 pages.
Dries van Thourhout et al. "Optomechanical device actuation through the optical gradient force", Nature Photonics, vol. 4, 2010, 7 pages.
French Preliminary Search Report dated Feb. 5, 2016 in French Application 15 59015, filed on Sep. 24, 2015 (with English Translation of Categories of cited documents).

* cited by examiner

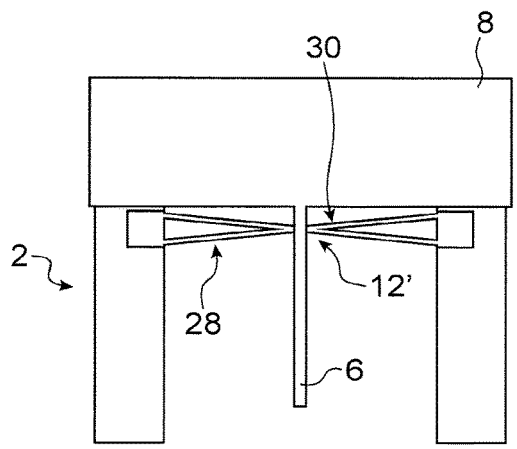
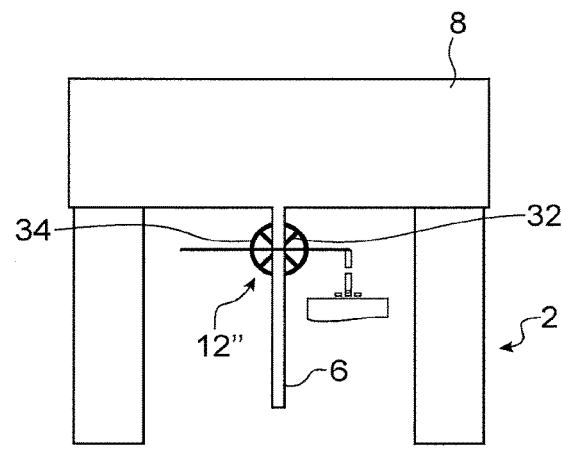
FIG.3A       FIG.3B
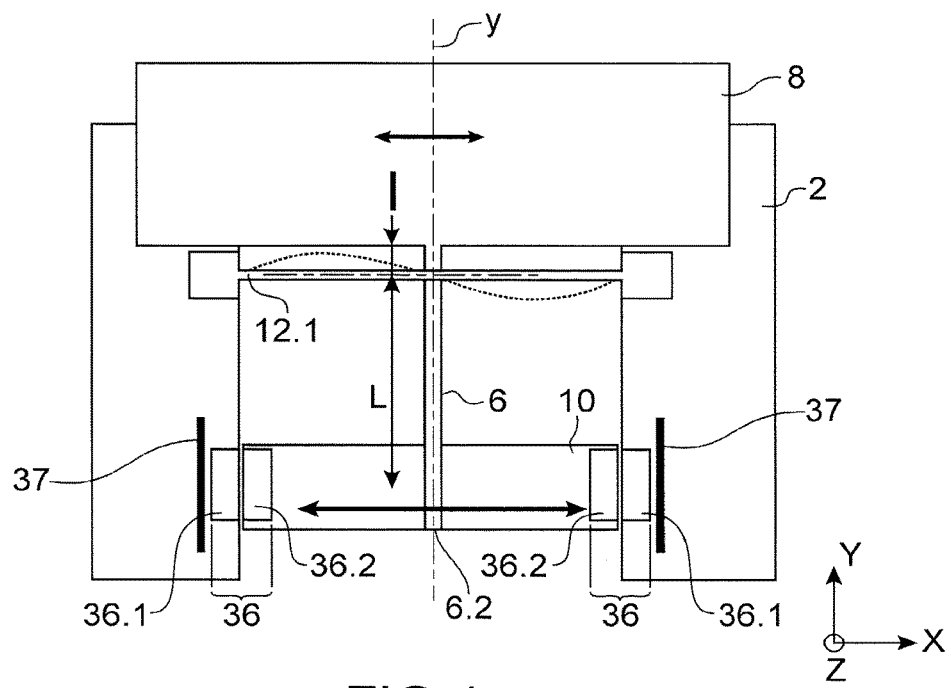
FIG.4

OPTO-MECHANICAL PHYSICAL SENSOR WITH AN IMPROVED SENSITIVITY

TECHNICAL FIELD AND STATE OF PRIOR ART

The present invention relates to a physical sensor, in particular an opto-mechanical inertial sensor with an improved sensitivity relative to opto-mechanical sensors from the state of the art, for example that can be implemented in making accelerometers, gyrometers, pressure sensors or field sensors such as magnetometers.

Sensors, in particular inertial sensors, such as accelerometers are commonly used in widely consumed portable apparatuses. Accordingly, it is attempted to make inertial sensors offering a good resolution, with a low overall space and reduced costs relative to existing inertial sensors.

An accelerometer comprises a suspended mass which is moved by an external force of acceleration, the displacement is measured and enables the acceleration undergone by the accelerometer and the system to which it is attached to be determined. The detection of the mass displacement is made for example by capacitive means.

Document Dong, B., Cai, H., Tsai, J. M., Kwong, D. L., & Liu, a. Q. (2013). *An on-chip opto-mechanical accelerometer.* MEMS2013, 641-644. doi:10.1109/MEMSYS.2013.6474323 describes an opto-mechanical accelerometer which comprises a ring shaped resonator and a suspended mass in the proximity of the ring. The mass carries an arc of circle being concentric with the ring, disposed at rest at a given distance from the ring. The mass displacement causes a modification in the distance between the ring and the arc, and as a result, there is a modification in the effective refractive index of the ring because of the disturbance of the evanescent waves. This index variation is measured and enables the acceleration undergone to be deduced therefrom.

This accelerometer has a relatively limited acceleration sensitivity.

DISCLOSURE OF THE INVENTION

The object of the present invention is to offer a physical sensor, in particular an opto-mechanical inertial sensor, with an increased sensitivity.

The previously mentioned object is achieved by a physical sensor comprising a movable mass, at least one optical resonator, means for converting the displacement of the mass or the stress undergone by the mass into a modification of the resonance frequency of the optical resonator, said converting means being such that they amplify the displacement or the stress from the displacement from the mass to the optical resonator so as to obtain a modification in the resonance frequency of the optical resonator.

In other words, the invention implements a lever arm effect to increase the effect of a displacement of the mass resulting, for example, from the application of an inertial force or an inertial stress undergone by the mass, on the optical resonator and thus increasing its detection sensitivity of the sensor.

In one embodiment, the amplitude of the mass displacement is amplified causing a variation in the resonance frequency(ies) of the optical resonator(s) by a remote influence.

In another embodiment, the stress causing the mass displacement is amplified, this stress being applied on the optical resonator(s), causing a variation in the resonance frequency(ies) of the optical resonator(s) by a reversible mechanical deformation of the optical resonator(s).

In another embodiment, wherein the resonator(s) is (are) mechanically deformed as in the previous embodiment, it is further provided to mechanically vibrate the resonator(s) and to measure a variation in the optical resonance frequency of the resonator(s) due to the reversible mechanical deformation of the optical resonator.

Very advantageously, the sensor is a micro-opto-mechanical and/or nano-opto-mechanical system, the mass and the beam are advantageously made in a thick layer whereas the optical resonator is made in a thin layer. The sensibility of the sensor is further improved, the mass having a higher inertia.

By way of example, the sensor can be implemented in an accelerometer or in a gyrometer.

Advantageously, the sensor comprises two optical resonators mounted as a differential.

The optical resonator(s) is (are) for example micro-optical disks, micro-toroidal cores or photonic crystals.

Therefore, the object of the present invention is to provide a physical sensor comprising from a substrate:
- a mass movable relative to the substrate, said mass being able to be moved by an external force,
- at least one first optical resonator, associated with a first guide structure for injecting in the first optical resonator a light wave injected and collecting at the output of the first optical resonator a light wave collected,
- a mechanical structure able to modify the optical resonance frequency of said first optical resonator,
- means for transmitting the displacement of the mass or the external force undergone by the mass to the mechanical structure, said transmitting means being rotatably hinged relative to the substrate by a pivot connection and the mass being mechanically fixed to the transmitting means, the mechanical structure being disposed relative to the mass and to the pivot connection such that the transmitting means transmit to this mechanical structure, in an amplified manner, the displacement of the mass or the external force undergone by the mass.

The object of the present invention is also to provide a measuring assembly comprising at least one sensor according to the invention, a source of a light wave able to be injected at least in the first guide structure, at least one detector for the light wave collected disposed at the output of the first guide structure, and a unit for processing at least the signal(s) collected by the detector.

BRIEF DESCRIPTION OF THE DRAWINGS

The present invention will be better understood based on the description that follows and the appended drawings on which:

FIGS. 3A and 3B are top views of alternative embodiments of the sensor of FIG. 1, FIG. 4 is a top view of another exemplary sensor, in particular an inertial sensor according to the first embodiment implementing photonic crystals.

DETAILED DISCLOSURE OF PARTICULAR EMBODIMENTS

Figure 1A:
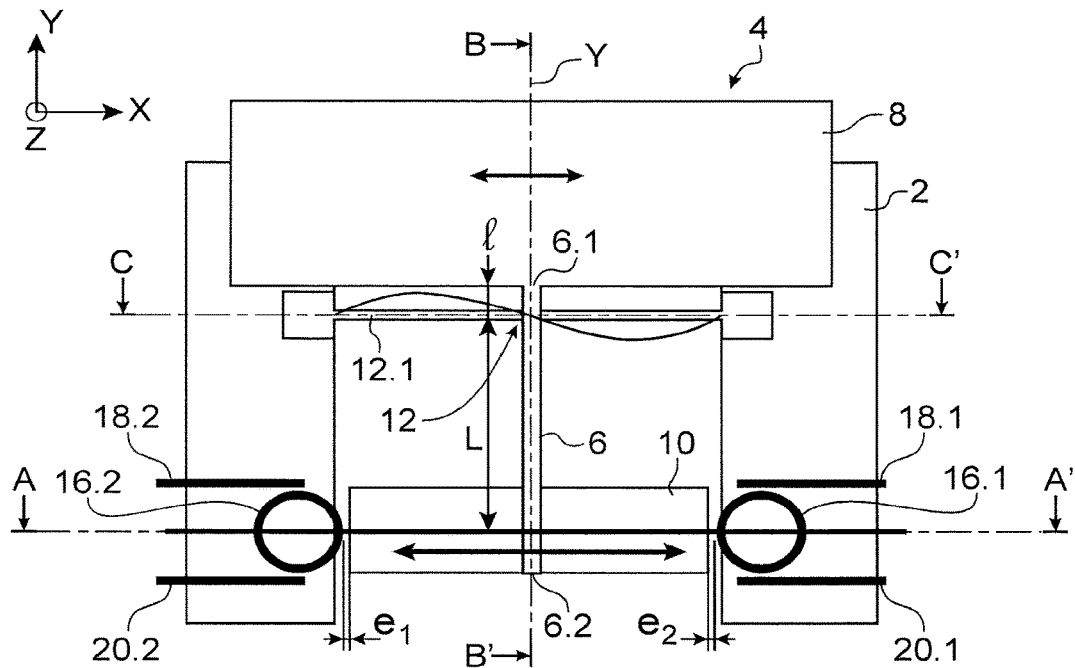
FIG. 1A is a top view in a schematic representation of a first exemplary embodiment of a sensor, in particular an inertial sensor.

FIG. 1A is a top view of an exemplary embodiment of the sensor according to a first embodiment, which is an inertial sensor, comprising a substrate 2 and a structure 4 suspended relative to the substrate 2.

The structure 4 is able to be moved relative to the substrate substantially in the plane of the sensor about an axis of rotation Z perpendicular to the plane of the sensor XY which is the plane of the sheet in the representation of FIG. 1A.

The structure 4 comprises a beam 6 having a longitudinal axis Y, a mass 8 located at a first longitudinal end 6.1 of the beam 6 and an influence element 10 located at a second longitudinal end 6.2 of the beam 6.

In the example represented, the influence element 10 is formed by a rigid plate.

The beam 6, mass 8 and influence element 10 assembly forms a rigid assembly. The structure is rotatably hinged about the axis Z relative to the substrate by means of a pivot connection 12.

In the following of the description, the beam 6 will be designated as a "lever arm" to avoid any confusion with beams forming a suspension arm or a pivot connection.

The pivot connection 12 comprises, in the example represented, two beams 12.1 extending on either side of the lever arm 6 perpendicular thereto, to the substrate, each beam 12.1 being anchored to the substrate by an anchoring pad. Both beams 12.1 are flexurally deformable.

The sensor also comprises at least one optical resonator, in the example represented two optical resonators on the substrate. The optical resonator(s) 16.1, 16.2 is (are) fixed relative to the substrate and is (are) disposed relative to the influence element such that a variable length air gap is delimited between the influence element and the optical resonator(s) 16.1, 16.2.

In the example represented, the influence element extends along the axis X perpendicular to the lever arm and is disposed between both optical resonators. The influence element 10 comprises two end faces 10.1, each facing an optical resonator 16.1, 16.2, delimiting with the same an air gap e1, e2 respectively. Both air gaps vary in opposite direction allowing a differential measurement.

Advantageously, at rest, i.e. when the mass is stationary relative to the substrate, the values of the air gaps e1 and e2 are equal.

In the example represented, both optical resonators are similar, only the optical resonator 16.1 will be described in detail.

The resonator 16.1 comprises a ring. Further, a coupling wave guide 18.1 enables an incident light beam to be injected, for example a continuous one, into the resonator and a coupling wave guide 20.1 enables the transmitted or reflected light beam to be collected.

The wave guides are disposed on either side of the ring in the direction Y.

The incident beam is for example emitted by a laser.

The beam transmitted or reflected is collected for example by a photodetector.

The beam can be emitted by an external laser the light of which is coupled by a coupling network or by an injection through the edge. The laser can also be brought back above the injection wave guide and the light is directly coupled in this guide in evanescent coupling. The detector is placed above a second network which scatters light on the detector. According to an alternative mode, the detector is directly placed at the end of the output wave guide. The beam transmitted or reflected by the optical resonator will be designated as "detection beam" in the following.

The pivot connection 12 is located along the lever arm 6 such that a lever effect occurs and that the displacement of the influence element is amplified relative to that of the mass. For this, the pivot connection 12 is located at a shorter distance from the mass than from the influence element 10. The distance between the pivot connection and the edge of the mass along the direction X is noted I and the distance between the middle zone of the influence element and the pivot connection is noted L, L being higher than I. Preferably, L is chosen to be very large relative to I to optimise the lever effect by taking manufacture and overall space requirements into account. L is typically between 1 μm and a few tens of microns and I is typically between hundreds of nanometres and a few microns.

Figure 2A:
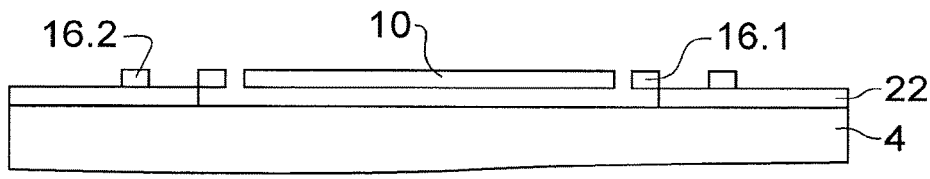
Figure 2B:
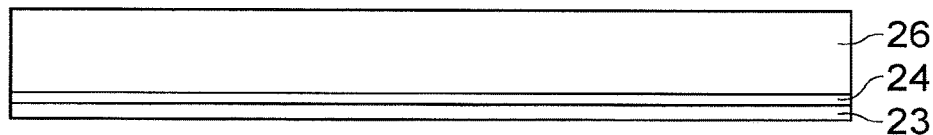
Figure 2B:
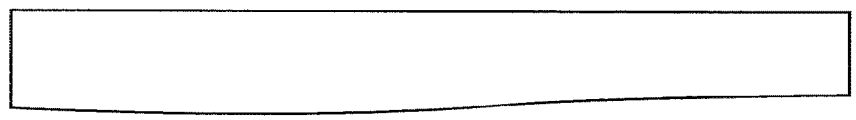
Figure 2C:
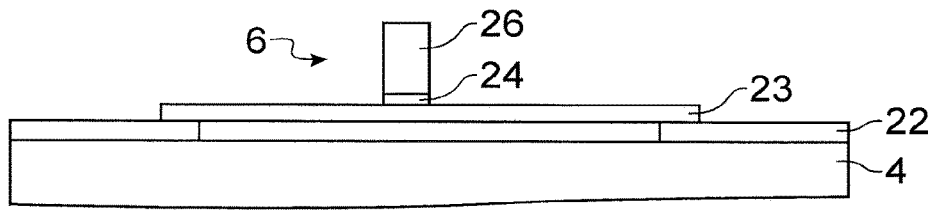

In FIGS. 2A to 2C, the sensor of FIG. 1A can be seen along different section planes.

The movable structure is suspended to the substrate 4 via a layer 22, called a sacrificial layer for example of oxide, which is partly etched to release the movable structure.

The structure is made in a stack comprising a thin layer 23, called a NEMS layer, a middle layer 24 and a thick layer 26, called a MEMS layer.

For example, the MEMS layer comprises silicone, polysilicon or amorphous silicon and for example has a thickness between 100 nm and 500 nm, and the NEMS layer comprises for example silicon, SiGe or Ge and has for example a thickness between 10 μm and 100 μm.

The material of the layer(s) is chosen as a function of the mechanical properties and the desired range of optical wavelength.

Preferably and as is represented in FIG. 2C, the mass and the lever arm are made in a thick layer, called a MEMS layer, and the influence element and/or the suspension means, and/or the wave guides and/or the optical resonators can be made in a thin layer, called a NEMS layer.

As a variant which is also advantageous, the mass, the lever arm and the influence element are made in the MEMS thick layer, and the suspension means, and/or the wave guides and/or the optical resonators can be made in the NEMS thin layer.

The resonators 16.1, 16.2, the coupling waveguides 18.1, 18.2, the coupling wave guides 20.1, 20.2 can have a thickness between 100 nm and 1 µm, preferably of the order of 200 nm and the beam 6, the mass and the influence element 10 can have a thickness between 1 µm and 50 µm, preferably equal to 20 µm.

This embodiment enables a mass having a greater inertia to be made, which further improves the sensitivity of the sensor.

As a variant, the optical elements such as the resonator(s) and the suspension means can be made in different layers.

Alternatively, the optical resonator(s) comprise(s) micro-optical disks or micro-toroidal cores.

Preferably, in one embodiment of a differential measurement sensor, both optical resonators are of similar structures.

Figure 1B:
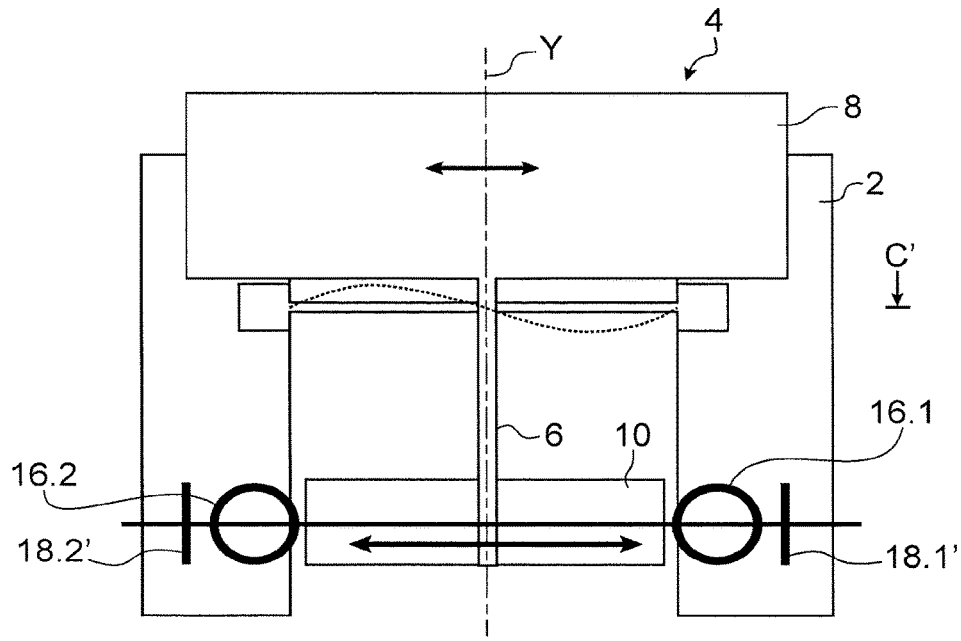
FIG. 1B is a top view of a variant of the sensor of FIG. 1A, FIGS. 2A, 2B and 2C are cross-section views of the sensor of FIG. 1 along planes A-A', B-B' and C-C', respectively.

In FIG. 1B, an alternative embodiment of the sensor of FIG. 1A can be seen in which, for each resonator 16.1, 16.2, a single coupling wave guide 18.1', 18.2' respectively injects the incident light beam in the resonator and collects the beam transmitted or reflected.

Several resonators could be provided on one side or on each side of the influence element.

The operation of the sensor of FIG. 1A will now be described.

Figure 5:
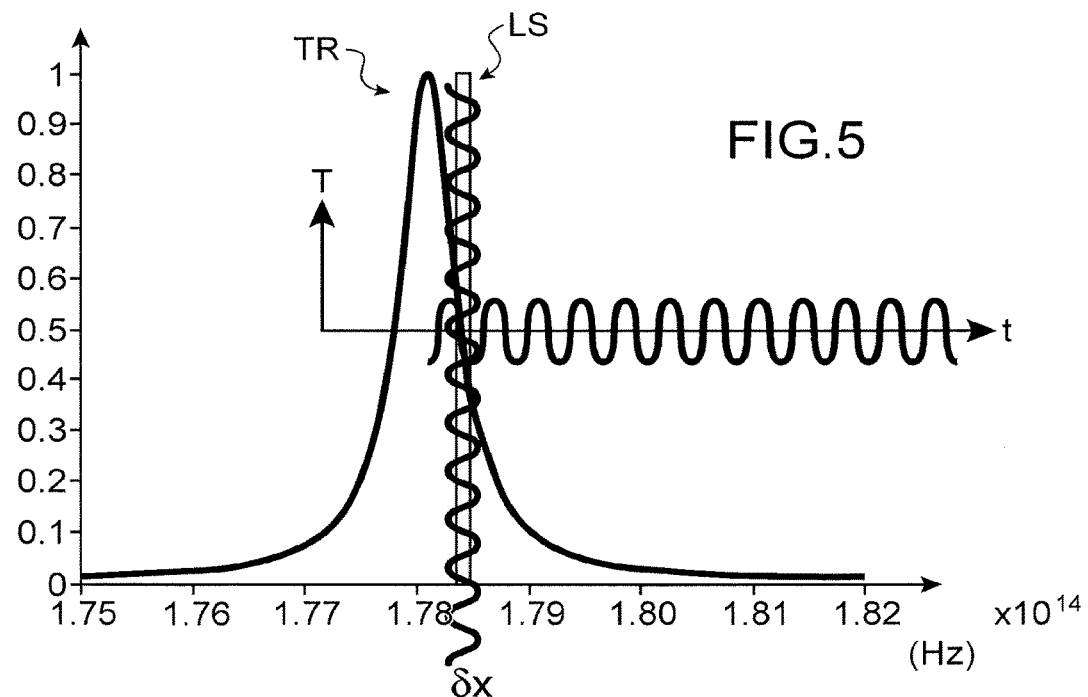
FIG. 5 is a graphic representation of the transfer function of an optical resonator implemented in a sensor according to the invention, in particular an inertial sensor.

In FIG. 5, the representation of the amplitude transfer function designated Tr of an optical resonator implemented in a sensor according to the invention can be seen. LS designates the operating frequency of the probe laser injected in the resonator.

Also depicted are the displacement of the mass δx as a function of time and the amplitude modulation T of the detection optical signal as a function of time. The transfer function could alternatively be a phase transfer function.

Preferably, the frequency of the beam injected is offset relative to the wavelength giving the transmission maximum in order to inject at a frequency in a high-slop zone. Thus, a low variation in the resonance frequency of the optical resonator, the resonance frequency corresponding to the maximum of the transfer function, causes a strong amplitude variation. Typically, the offset of the optical resonance frequency normalised at the optical frequency at rest is in the order of the few ppm (parts per million) which corresponds to a modulation of a few tens of ppm.

At rest, the influence element is found at a given distance e1, e2 of each of the rings 16.1, 16.2 respectively, the value of the effective optical index i1, i2 of each of the rings 16.1, 16.2 at rest depends on the values e1 and e2. These indices i1, i2 set the resonance frequencies at rest of the rings 16.1, 16.2 respectively.

Only the detection by the resonator 16.1 will be described, since the detection is similar on the resonator 16.2.

The laser continuously injects a probe beam in the wave guide 18.1, this flows in the ring. A detection beam is collected by the detection wave guide 20.1.

Under the effect of an external inertial force, for example an acceleration, the mass is moved about the axis Z. The influence element 10 also pivots about Z. Because of the lever arm effect, any movement δx of the mass 8 causes a displacement of the influence element with an amplitude amplified by a factor L/l. The air gap value e1 varies with the displacement of the influence element, this air gap modification causes a modification in the effective optical index of the ring 16.1. This optical index variation causes a modification in the optical resonance frequency of the ring 16.1, which modifies the transfer function of the resonator 16.1. This modification of the transfer function is detected by an amplitude modulation of the detection beam. From measurements of the amplitude modulation, it is possible to deduce the characteristics of the inertial force. The modification in the optical resonance frequency of the ring also modifies the frequency of the detection signal. Alternatively, by measuring this frequency, it is possible to deduce the characteristics of the inertial force.

The detection on the resonator 16.2 is made in a similar way as that on the resonator 16.1. Nevertheless, when e1 increases, e2 decreases. By combining the measurements on the detection beams exiting from the wave guides, a differential measurement is made.

It will be understood that the sensor can only comprise one optical resonator.

In FIG. 1A, the pivot connection between the structure and the substrate comprises two flexurally deformable beams. In FIG. 3A, an alternative embodiment can be seen, wherein the pivot connection comprises two pairs of beams 28, 30, each pair being disposed on either side of the lever arm. The beams 28, 30 of each pair are anchored through one end to the substrate and anchored through another end to the lever arm at the same point. The other pair is symmetrically mounted to the substrate and to the lever arm, the anchoring point of the four beams to the lever arm defining the axis of the pivot connection. The beams are flexurally deformable.

In FIG. 3B, another alternative embodiment of the pivot connection 12" comprising four cross-shaped beams 32 suspended between the lever arm and a ring 34 fixed to the substrate can be seen.

As a further variant, the pivot connection could comprise a pin having an axis Z integral and anchored through one end to the substrate and through another end to the lever arm and being torsionally deformable.

In FIG. 4, another exemplary embodiment of a sensor according to the first embodiment can be seen, which in this example is an inertial sensor, wherein the optical resonators each comprise a photonic crystal 36.

Each photonic crystal 36 comprises a first part 36.1 carried by the substrate and a second part 36.2 carried by the movable structure facing the first part 36.1 and which are disposed such that the distance between the first 36.1 and second 36.2 parts of photonic crystal varies with the displacement of the mass. A light beam flows between the first 36.1 and second 36.2 parts of the crystal, the variation in the distance between both parts 36.1, 36.2 of the crystal modifies the natural frequency of the resonator, which can then be measured by measuring the frequency of the light beam transmitted. The system herein operates in transmission with a wave guide 37 coupled to the photonic crystal.

The value of the limit of detection (LOD) will be given for a sensor of FIG. 1A.

The sensor comprises:
- a test mass having a length of 100 µm, a width of 50 µm and a thickness of 10 µm,
- a lever arm effect of L/l=5,
- a fineness $F=ISL/\delta\lambda$ of 10 for a silicon ring shaped optical resonator with an effective index neff=2.4, and with a radius R=50 µm, that is a free spectral range or ISL in the order of 3.2 nm.

The calculation of the limit of detection takes the laser noise, the electronics noise and the noise of the photodiode which collects the beam transmitted or reflected into account.

The mean power injected is in the order of 1 µW and the laser noise in the order of $6\times10^{-11}$ W/√Hz (this corresponds to a relative noise of −145 dB/Hz for a mean emitted power of 0 dBm). The photodiode noise characterised by its Noise Equivalent Power (NEP) is 1 pW/√Hz for a gain GR of 5×10⁴ and the typical electronics noise is 10 nV/√Hz.

Under these conditions, the limit of detection at 3σ is 0.5 ng for a 100 ms integration time. By way of comparison, the measurements or calculations given in the literature reveal limits of detection limited to a few µg. The lowest limit reached is 5 ng for 1 s integration time on more solid components in capacitive reading. Thus, the invention makes it possible to gain one order of magnitude on the limit of detection by being 10 times quicker over the duration of the measurement.

Figure 6A:
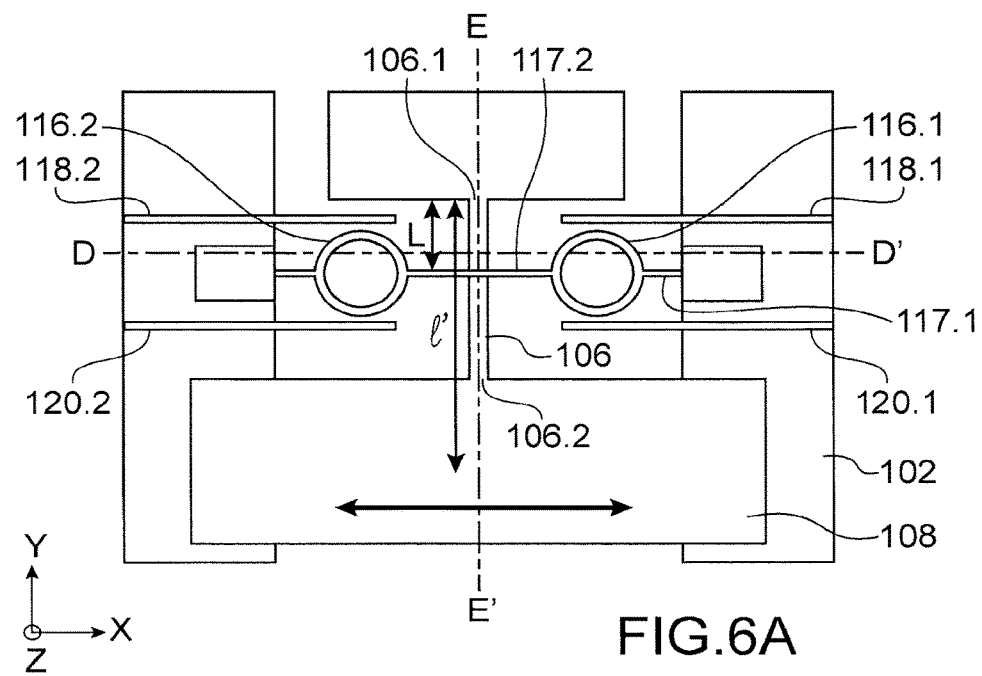
FIG. 6A is a top view in schematic representation of a second exemplary embodiment of a sensor, in particular an inertial sensor at rest.
Figure 6B:
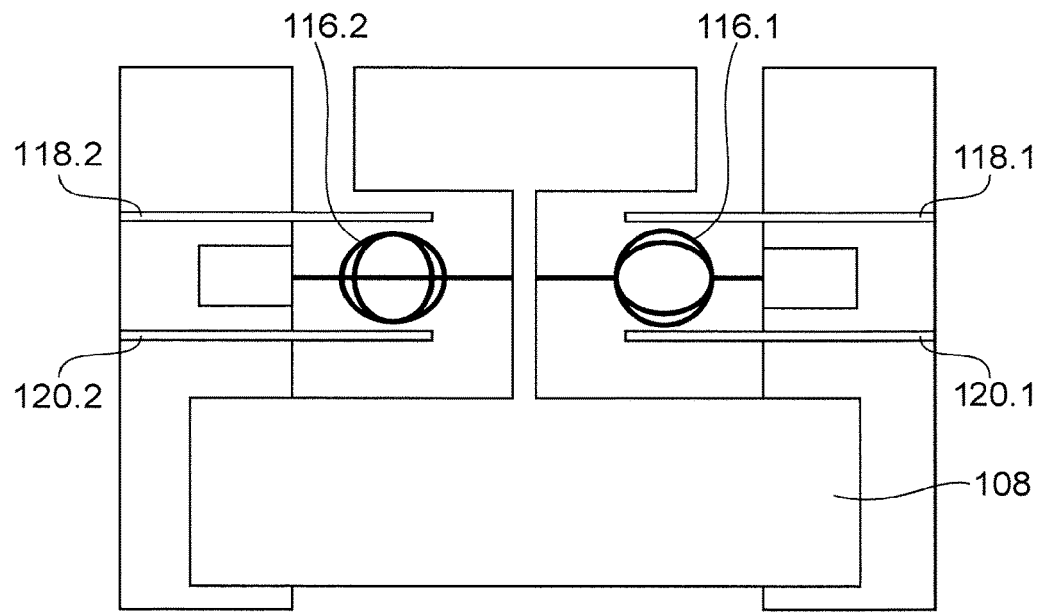
FIG. 6B is a view of the sensor of FIG. 6A in a detection phase.

FIGS. 6A and 6B are top views of an exemplary embodiment of a second embodiment of a sensor according to the invention. This differs from the sensor according to the first embodiment in that the optical resonators are mechanically deformed.

The sensor of FIGS. 6A and 6B comprises a substrate 102 and a structure 104 suspended relative to the substrate 102.

The structure 104 is able to be displaced relative to the substrate substantially in the plane of the sensor about an axis of rotation Z perpendicular to the plane of sensor XY which is the plane of the sheet in the representation of FIG. 6A.

The structure 104 comprises a beam 106 having a longitudinal axis Y mechanically embedded through a first end 106.1 to the substrate. The structure 104 also comprises a mass 108 located at a second longitudinal end 106.2 of the beam 106.

The structure is able to pivot in the plane about the axis Z by virtue of the pivot connection formed between the beam 106 and the embedding, the beam 106 being flexurally deformed.

The sensor also comprises at least one optical resonator, in the example represented two optical resonators on the substrate. The optical resonator(s) 116.1, 116.2 is (are) disposed on either side of the axis Y of the beam 106.

Each resonator is suspended between the substrate and the beam 106. In the example represented, the resonators comprise a ring.

Each ring is suspended to a substrate 102 through a beam 117.1 embedded on the substrate and to the lever arm through a beam 117.2. The beams 117.1 and 117.2 are intended to transmit a stress to the resonators.

The beams 117.1, 117.2 are sufficiently mechanically rigid to avoid any flexure or buckling and transmit the stress to the optical resonators. Further, the optical resonators have a high mechanical rigidity along the axis of the beams. The sensors of FIGS. 8A and 8B which will be described in the following offer optical structures having an "enhanced" rigidity.

A probe wave guide 118.1 for conveying the incident light beam, for example a continuous one, in the ring is provided for each ring. It extends along the ring and is cantilevered on the substrate. A detection wave guide 120.1 for the detection light beam is also provided for each resonator cantilevered on the substrate. The wave guides extend on either side of the ring parallel to each other.

The distance between the embedding of the lever arm and the centre of gravity of the mass is designated I', and the distance between the embedding and the application point of the stress on the resonators, i.e. the connecting point between the lever arm and the beams 117.2 connected to the resonators is designated L'.

Preferably, I' is chosen to be very large relative to L' to increase the amplification of the stress undergone by the mass and applied to the resonators.

I' is typically between 1 µm and a few tens of microns and L' is typically between about one hundred nanometres and a few microns.

The optical resonator(s) can as a variant comprise one or more micro-optical disks and one or more micro-optical toroidal cores.

The incident beam is for example emitted by a laser. The beam transmitted or reflected is collected for example by a photodetector.

Figure 7A:
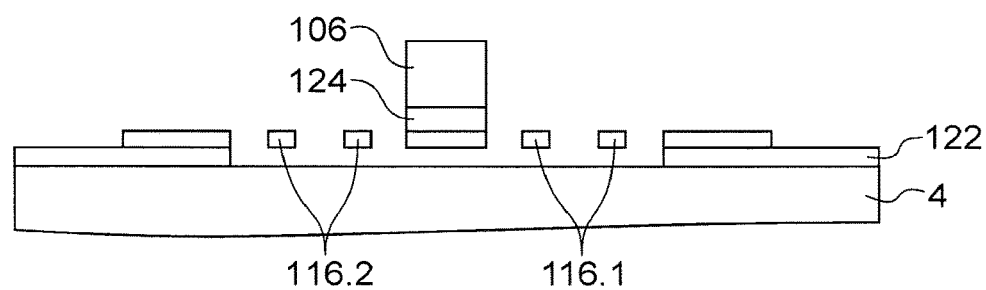
FIGS. 7A and 7B are cross-section views of the sensor of FIG. 6A along the planes D-D' and E-E' respectively.
Figure 7B:
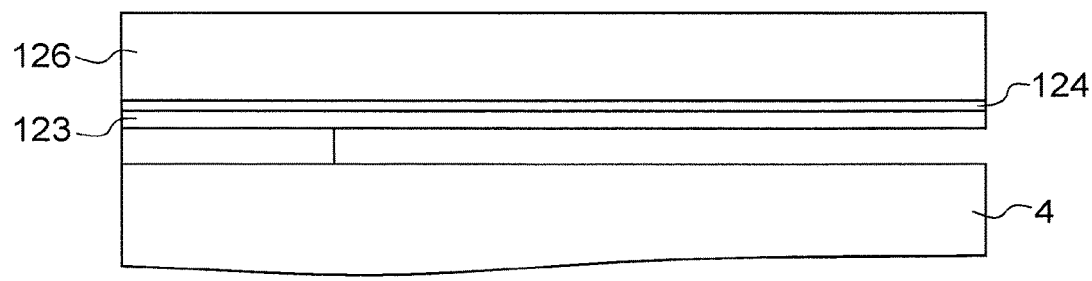

In FIGS. 7A and 7B, cross-section views of the sensor of FIG. 6A along the plane D-D' and E-E' respectively can be seen.

The movable structure is suspended to the substrate via a layer 122, called a sacrificial layer for example of oxide, which is partly etched to release the movable structure.

The structure is made in a stack comprising a thin layer 122, called a NEMS layer, a middle layer 124 and a thick layer 126, called a MEMS layer.

For example, the MEMS layer comprises silicon, polysilicon or amorphous silicon and has for example a thickness between 100 nm and 500 nm and the NEMS layer comprises for example silicon, SiGe or Ge and has for example a thickness between 10 µm and 100 µm.

The material of the layer(s) is chosen as a function of the mechanical properties and the range of the desired optical wavelength.

Preferably and as is represented in FIG. 7A, the mass and/or the lever arm are made in a thick layer, called a MEMS layer and the optical resonator(s) and/or the beams 117.1, 117.1 can be made in a thin layer, called a NEMS layer. This embodiment enables a mass having a greater inertia to be made, which further improves the sensitivity of the sensor.

The elements only made in the NEMS layer are for example defined by lithography and etching.

Figure 8A:
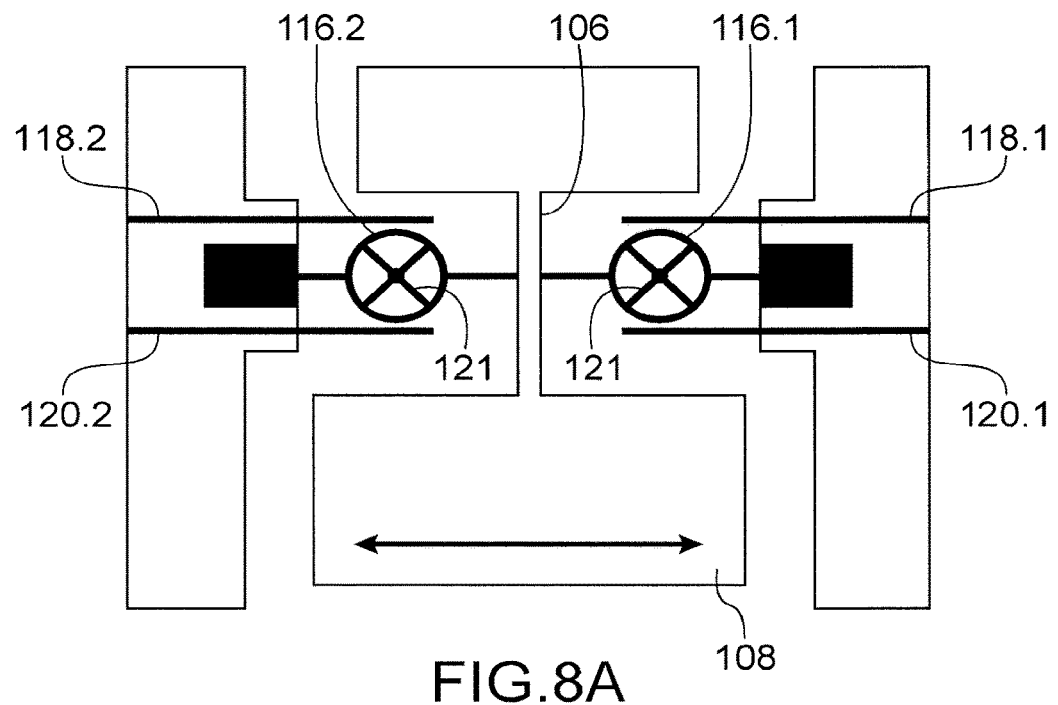
FIG. 8A is a top view of an alternative embodiment of the sensor of FIG. 6A.

In FIG. 8A, an advantageous alternative embodiment of the sensor of FIG. 6A can be seen, wherein further holding means 121 for the optical resonators are provided. In the example represented, these further holding means comprise four cross-shaped arms the ends of which are connected to the internal periphery of the ring and the cross centre is connected to the substrate for example via a pin parallel to the axis Z.

These holding means enable a more rigid system to be obtained offering a better stress transmission.

Figure 8B:
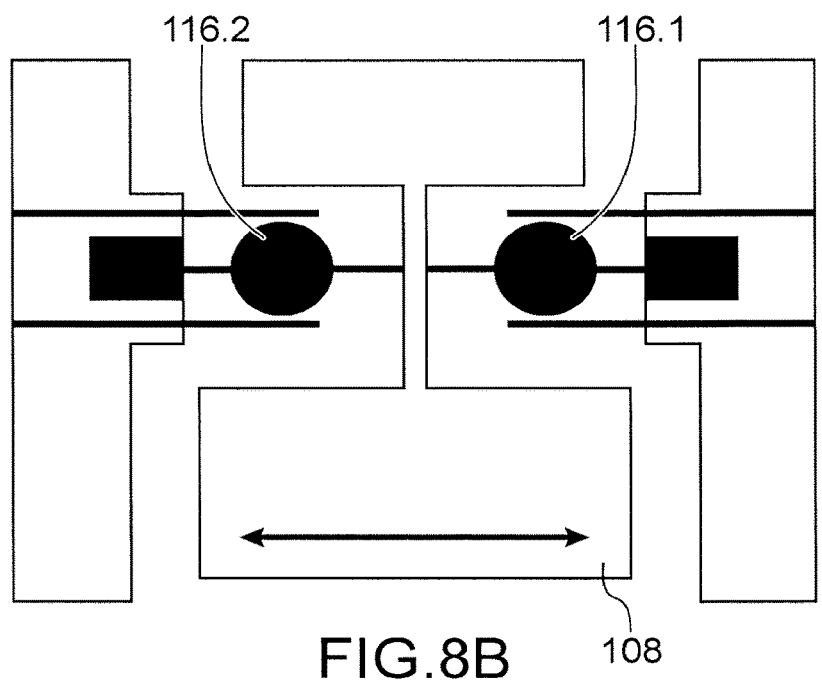
FIG. 8B is a top view of another alternative embodiment of the sensor of FIG. 6A.

In FIG. 8B, another even further advantageous alternative embodiment of the sensor of the FIG. 6A can be seen, wherein the optical resonators 116.1, 116.2 comprise resonating disks. Indeed, the disks offer a further increased rigidity relative to the rings of FIG. 8A and thus a better stress transmission.

Figure 9:
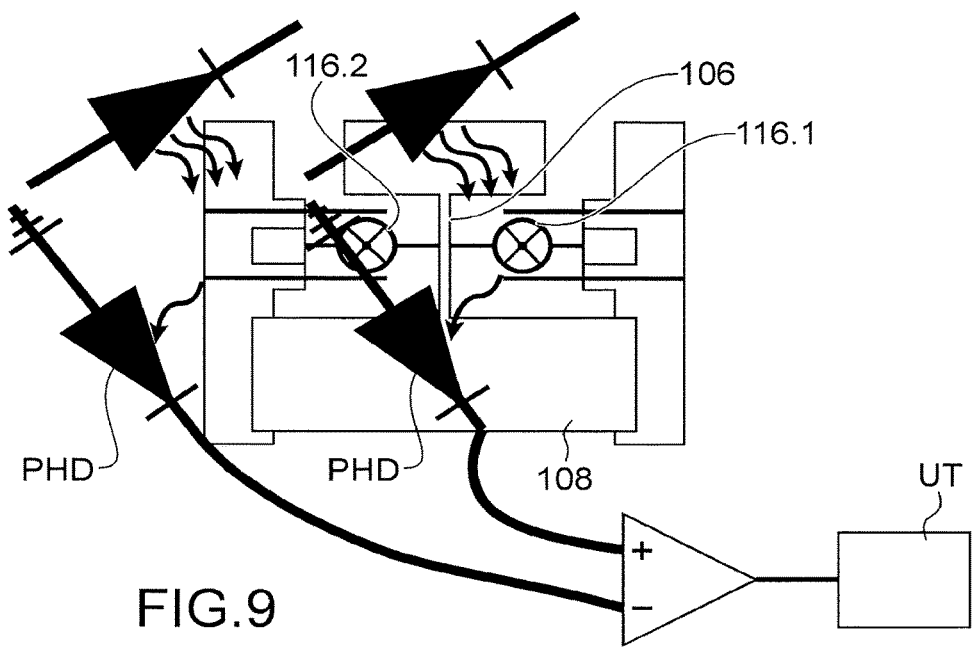
FIG. 9 is a schematic representation of the sensor of FIG. 6A with the probe lasers and photodetectors.

The operation of the sensor will now be described in connection with FIG. 9 which depicts lasers and photodetectors.

An incident beam injected into the resonator 116.1 is emitted by the laser, preferably, its frequency is offset relative to that giving the maximum transmission or reflection peak. A detection beam is collected for example by photodetectors PHD. The photodetectors transmit the signals to a processing and calculating unit UT for processing the signals from both resonators and determining the force.

When an external inertial force occurs, for example an inertial force, such an acceleration, the mass is displaced about the axis Z. The beams 117.1 and 117.2 exert a stress onto the optical resonators, one of the resonators is compressed whereas the other is stretched. The stress applied is amplified relative to the inertial stress by a ratio L'/I' because of the lever arm effect. In the case of optical rings, by being deformed, they become ellipses as a first approximation.

The stress induces a deformation of the optical resonator causing both a variation in the length of the resonant cavity and a variation in the effective index viewed by the photons of the cavity. In FIG. 6B, the optical rings deformed under the effect of the inertial stress amplified can be seen as represented schematically. Indeed, this index varies by electrostrictive effect. This electrostrictive effect is superimposed with the geometrical deformation. Consequently, the inertial stress applied to the resonators, by deforming the resonators, modifies the length of the cavity and its effective optical index.

The sensor according to the second embodiment therefore offers a greater sensitivity.

As for the first embodiment, the modification in the optical index of the resonator causes a variation in the frequency or an amplitude variation in the detection beam. From these measurements, the characteristics of the force applied to the mass can be determined.

In the example represented, a differential measurement is performed, two probe lasers and two photodetectors, one for each resonator, are then implemented. As for the first embodiment, the sensor can comprise only one resonator.

Under the same conditions as applied to the sensor of FIG. 1A, and by considering the perimeter variation of the optical resonators and by not considering the electrostrictive effect, the limit of detection at 3σ is 1 ng for a 100 ms integration time.

When the electrostrictive effect is taken into account, the response can be improved by a factor 2, the resolution can thereby be 0.5 ng. The influence of the electrostrictive effect depends for example on the materials used for making the optical resonators, for example AsGa enables the influence of the electrostrictive effect to be increased. Other materials as SiN or Si can be used.

A sensor according to a third embodiment with a frequency detection will now be described.

The sensor has a structure similar to the sensor of FIG. 6A, thereby the same references are used again, and it further comprises means for vibrating the resonator(s) such that it (they) form(s) one or more mechanical resonators. Advantageously, the means optically actuate the resonator(s). The means comprise, for each resonator, for example an excitation light source which is amplitude-modulated at a mechanical resonance frequency of the resonator, this frequency is different from the frequency of the probe beam.

The excitation light source is for example a laser source designated a pump laser. The mechanical resonance frequencies can range from 10 MHz to 1 GHz depending on the materials and dimensions. They correspond to a natural frequency of the resonator cavity. The light source has an optical power sufficient to generate the movement through a photon radiation pressure. The power is for example between 100 nW and 100 μW. The mechanical vibrating will be all the more strong that the optical quality factor will be high.

A a variant, the vibrating of the resonator(s) can be achieved by other means, for example by capacitive type electrical means.

Figure 10:
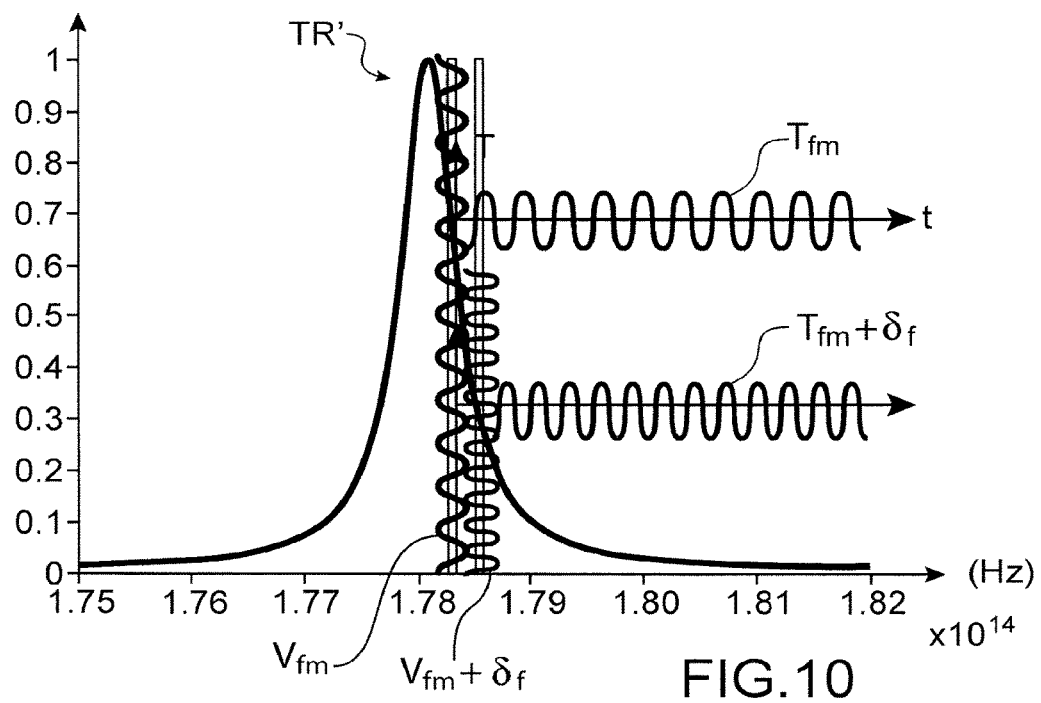
FIG. 10 is a graphic representation of the transfer function of an optical resonator implemented in a sensor according to a third embodiment, in particular an inertial sensor.

In FIG. 10, the transfer function TR' of the sensor can be seen as represented. The vibration $Vf_m$ at the mechanical frequency $f_m$ in Hz of the resonator and the vibration $Vf_m+\delta f$ at the mechanical frequency $f_m+\delta f$ in Hz of the resonator are represented, when a mechanical stress due to an external force is applied to the resonator. The variations in the detection light intensity $Tf_m$ and $Tf_m+\delta f$ for both mechanical frequencies are depicted.

The operation of the frequency detection sensor will now be described.

The probe laser injects a probe beam into the resonator. A photodetector collects the detection beam.

The pump laser injects a light beam at a mechanical resonance frequency of the opto-mechanical resonator. The optical resonator vibrates according to a natural deformation mode, of the Whispering-gallery-mode (WGM) type, of the extensional mode type for example, which induces, at much shorter time scales than the acceleration signal itself, a variation in the length of the optical cavity, modulating the optical natural frequency of the opto-mechanical resonator as a function of the mechanical vibration induced by the optical actuation.

As for the operation of the second embodiment, this deformation of the resonator causes an amplitude modulation of the intensity transmitted or reflected by the resonator (at the mechanical resonance frequency of the opto-mechanical resonator), in the absence of an external force.

For example, when an inertial force is applied to the sensor, the mass is moved, a stress is thereby applied to the resonator, which modifies the mechanical resonance frequency, modifying the optical resonance frequency. As a result, there is a modulation of the intensity transmitted due to the external inertial force, which is added to that of the resonator excitation.

Preferably, the variation in the mechanical frequency of the opto-mechanical resonator is measured between the zero-load (without stress) mechanical frequency and the mechanical frequency of the resonator modified by the occurrence of an external force. It is thereby possible to deduce the external force. The displacement of the test mass also induces a variation in the signal amplitude as shown in FIG. 10 because the operation point in the transfer function is displaced. By doing so, the amplitude of the optical signal varies. This detection method is an alternative to the frequency detection, however it has a less favourable signal-to-noise ratio.

Figure 11:
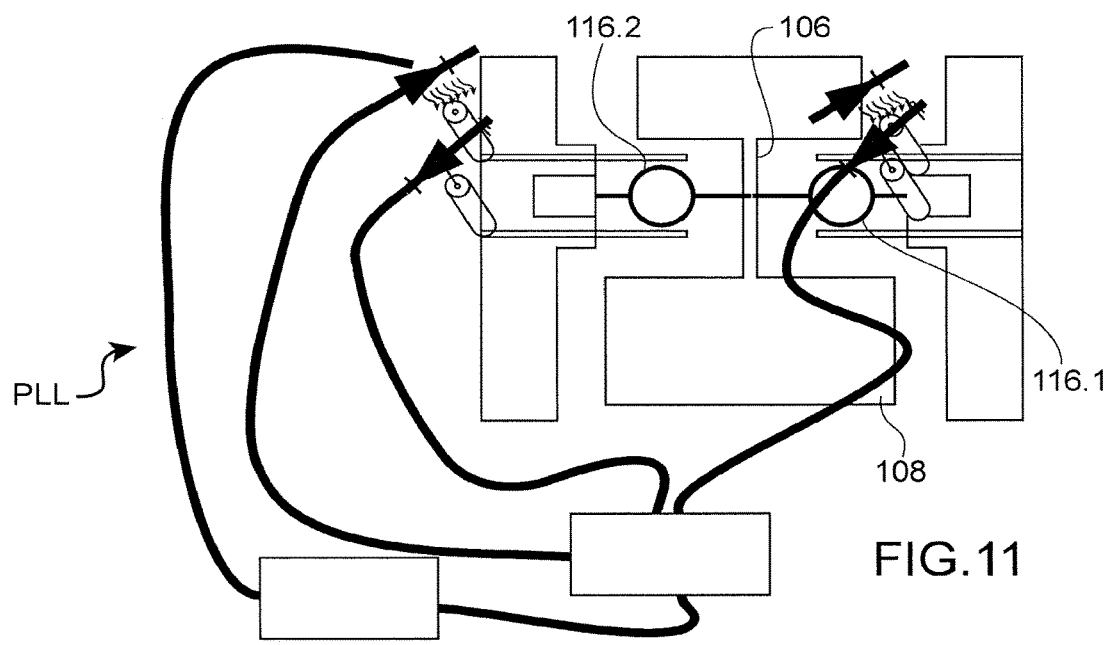
FIG. 11 is a schematic representation of the sensor according to the third embodiment with the probe lasers, photodetectors and a closed loop.

Advantageously, the follow-up of the mechanical resonance frequency, which is the modulation frequency of the detection optical signal, can be made through a closed loop PLL, for example by comprising a differential heterodyne reading (lock-in differential) schematically represented in FIG. 11 with a feed-back to a corrector to form a phase-locked loop (PLL). The heterodyne reading consists in using the modulation signal of the pump laser as a synchronisation signal of the Lock-in-Amplifier. This method further enables a low frequency detection to be made of an initially high frequency signal which is the mechanical resonance frequency of the opto-mechanical resonator.

The data processing enables the mechanical oscillation phase to be followed up and the amplitude modulation signal of the pump laser to be controlled, for example through an electro-optical modulator, or by directly modulating the laser.

For example, the sensor makes it possible to make accelerometers, multi-axis pyrometers by combining for example several inertial sensors, one for each axis, pressure sensors and field sensors, such as multi-axis magnetometers.

An exemplary embodiment of a magnetometer will now be described. The sensor can have for example the structure of FIG. 1A. The magnetometer comprises a magnetic layer deposited onto the mass. The magnetic layer comprises for example alternate ferromagnetic and antiferromagnetic layers formed on the test mass.

When the sensor undergoes a magnetic field, the mass carrying the layer 10 tends to be aligned on the external magnetic field. The displacement of the mass is amplified. The air gap between the mass and the resonator(s) varies. The detection is made by detecting this variation in the air gap in the manner described in connection with FIG. 1A.

As a variant, a magnetometer according to the present invention can implement the stress variation.

It will be understood that a magnetometer according to the invention can implement two optical resonators.

Generally, a mass is used for each axis. For the detection along the axis orthogonal to the plane of the sensor, the mass has an out-of-plane displacement, the optical resonator is thereby located in a plane parallel to the mass.

An exemplary embodiment of a pressure sensor will now be described.

It comprises a membrane, a transmitting beam rotatably hinged along an axis contained in the plane of the sensor, a first longitudinal end of which is intended to be displaced by the membrane, and an influence element fixed to a second longitudinal end of the beam, opposite to the first end relative to the axis of rotation. The sensor also comprises at least one optical resonator in a plane parallel to the plane of the sensor.

When a pressure is applied to the membrane, the deformation of the membrane is applied to the beam which displaces in an amplified manner the influence element which moves closer to or away from the optical resonator. The influence variation on the optical resonator is detected as for the sensor of FIG. 1.

The pressure sensor could be made according to the second embodiment, in this case the optical resonator would be located between the axis of rotation and the membrane.

It will be understood that a pressure sensor according to the invention can implement two optical resonators.

As explained above, sensors implementing an out-of-plane movement lever arm do not depart from the scope of the present invention.

The sensor according to the invention can be made by known methods in microelectronics for example from a Silicon On Insulator (SOI) substrate, by applying in particular lithography, etching, epitaxial growth steps.

The invention claimed is:

1. A physical sensor comprising:
   a substrate,
   a mass movable relative to the substrate, said mass being able to be moved by an external force,
   at least one first optical resonator, associated with a first guide structure for injecting in the first optical resonator an injected light wave and collecting at an output of the first optical resonator a collected light wave,
   a mechanical structure able to modify an optical resonance frequency of said first optical resonator,
   transmitting means for transmitting a displacement of the mass or the external force undergone by the mass to the mechanical structure, said transmitting means being rotatably hinged relative to the substrate by a pivot connection and the mass being mechanically fixed to the transmitting means, the mechanical structure being disposed relative to the mass and to the pivot connection such that the transmitting means transmits to the mechanical structure, in an amplified manner, the displacement of the mass or the external force undergone by the mass, wherein
   the mechanical structure modifies the optical resonance frequency of said first optical resonator without direct physical contact with said first optical resonator and wherein the transmitting means comprises a rotatably hinged beam relative to the substrate, the mass being integral with the beam the mass is secured to the beam on one side of the pivot connection and the mechanical structure is secured to the beam on the other side of the pivot connection,
   the mass and the transmitting means are formed in a same first layer and have substantially the same first thickness in a direction of an axis of pivoting, and
   the optical resonator is formed in a layer separate from the first layer and thinner than the first thickness in the direction.

2. The sensor according to claim 1, wherein the guide structure comprises either a wave guide for injecting the injected light wave and a wave guide for collecting the collected light wave, or a single wave guide disposed so as to perform both injecting the injected light wave and collecting the collected light wave.

3. The sensor according to claim 1, wherein the mechanical structure comprises at least one plate shaped element an edge of which is able to be moved closer to and away from the first optical resonator.

4. The sensor according to claim 3, wherein the plate shaped element is as thick as the mass in a direction of an axis of pivoting or made in a same layer as the mass.

5. The sensor according to claim 1, wherein the mechanical structure does not comprise any optical element.

6. The sensor according to claim 1, wherein the first optical resonator is an optical ring, an optical micro-toroidal core or a micro-optical disk.

7. The sensor according to claim 1, wherein the first optical resonator is a part of a photonic crystal disposed on the substrate, another part of the photonic crystal is integral with the mechanical structure, and the mechanical structure is integral with the transmitting means.

8. The sensor according to claim 1, comprising a second optical resonator associated with a second guide structure for injecting in the second optical resonator a second injected light wave with a frequency identical to the injected light wave in the first resonator, said second guide structure enabling collecting a second collected light wave at an output of the second resonator, the injected light wave in the first optical resonator and and said first and second optical resonators being disposed so as to enable a differential measurement.

9. A measuring assembly comprising the sensor according to claim 1, a source of a light wave able to be injected at least in the first guide structure, at least one detector for the collected light wave disposed at the output of the first guide structure, and a unit for processing a signal collected by the detector.

10. The measuring assembly according to claim 9, wherein the processing unit processes an amplitude modulation.

11. The measuring assembly according to claim 10, wherein the injectable light wave has a frequency different from a maximum transmission frequency of the first optical resonator in absence of influence of the mechanical structure on the resonance frequency of the first optical resonator.

12. The measuring assembly according to claim 9, comprising a second optical resonator associated with a second guide structure for injecting in the second optical resonator a second injected light wave, wherein the processing unit processes a variation in the optical resonance frequency of the first optical resonator or variations in the optical resonance frequencies of the first and second optical resonators as a differential.

13. The sensor according to claim 1, comprising:
the mechanism being disposed in an optical path of the first guide structure.

14. The sensor according to claim 1, comprising:
at least one first optical resonator, associated with a first guide structure for injecting in the first optical resonator an injected light wave and collecting at an output of the first optical resonator a collected light wave.

15. The sensor according to claim 2, wherein the mechanism is disposed in an optical path between the wave guide for injecting the injected light wave and the wave guide for collecting the collected light wave, or in the single wave guide disposed so as to perform both injecting the injected light wave and collecting the collected light wave.

* * * * *